(12) United States Patent
Kothari et al.

(10) Patent No.: US 7,940,463 B2
(45) Date of Patent: May 10, 2011

(54) FABRICATING AND USING HIDDEN FEATURES IN AN IMAGE

(75) Inventors: Manish Kothari, Cupertino, CA (US); Jonathan Charles Griffiths, Fremont, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 332 days.

(21) Appl. No.: 12/148,057

(22) Filed: Apr. 15, 2008

(65) Prior Publication Data

US 2009/0258301 A1 Oct. 15, 2009

(51) Int. Cl.
*G02B 27/14* (2006.01)
(52) U.S. Cl. .......... 359/634; 359/629
(58) Field of Classification Search .......... 359/634
See application file for complete search history.

(56) References Cited

U.S. PATENT DOCUMENTS

| | | | |
|---|---|---|---|
| 3,410,626 | A | 11/1968 | Magrath |
| 6,010,751 | A | 1/2000 | Shaw et al. |
| 6,031,653 | A | 2/2000 | Wang |
| 2006/0209413 | A1 | 9/2006 | Kim et al. |
| 2006/0285184 | A1 | 12/2006 | Phillips et al. |
| 2009/0212687 | A1* | 8/2009 | Cok .............. 313/504 |
| 2009/0279173 | A1 | 11/2009 | Chui et al. |

FOREIGN PATENT DOCUMENTS

| | | |
|---|---|---|
| EP | 1 826 731 | 8/2007 |
| WO | 95/17690 | 6/1995 |
| WO | WO 98/12583 | 3/1998 |
| WO | 2009/129234 | 10/2009 |
| WO | 2009/137535 | 11/2009 |

OTHER PUBLICATIONS

International Search Report and Written Opinion dated Jul. 23, 2009 issued in Application No. PCT/US2009/040517.
International Preliminary Report on Patentability dated Oct. 19, 2010, from Application No. PCT/US2009/040517.
International Search Report and Written Opinion mailed Aug. 14, 2009, from Application No. PCT/US2009/042916.
International Preliminary Report on Patentability dated Nov. 9, 2010, from Application No. PCT/US2009/042916.
Wang et al., "Realization of Integrated Narrow Bandpass Filters in the Infrared Region," International Journal of Infrared and Millimeter Waves, Springer, Dordrecht, NL, vol. 25, No. 11, Nov. 1, 2004, pp. 1677-1683, XP001213989.

* cited by examiner

*Primary Examiner* — Ricky L Mack
*Assistant Examiner* — James C Jones
(74) *Attorney, Agent, or Firm* — Weaver Austin Villeneuve & Sampson LLP

(57) ABSTRACT

Some implementations of the invention provide hidden static images. Some such images can only be perceived when viewed from an angle to the normal to a surface. Such images may appear as a solid color when viewed along an axis perpendicular to a surface, but may reveal a hidden image when viewed from an angle relative to that axis. The hidden image may be defined according to interfaces between areas that pass substantially the same wavelength when viewed along the axis, but which pass noticeably different wavelengths when viewed from an angle relative to that axis. The hidden images may or may not be discernable to a human observer. The hidden image may comprise a code that is not readable by an optical scanner positioned to read along an axis normal to a surface, but that is readable by an optical scanner positioned to read along another axis.

20 Claims, 13 Drawing Sheets

FABRICATING AND USING HIDDEN FEATURES IN AN IMAGE

BACKGROUND OF THE INVENTION

The present disclosure involves static images and related methods of fabrication and use.

Static images, which may include graphic images, patterns, text, codes and the like, have many uses. Images and patterns may be purely decorative, or they may be associated with a product, a brand name, etc. Textual images may convey various types of information. Codes may be used in various contexts. Bar codes, for example, are now widely used for identifying product types, tracking inventory and the like. Although existing methods for fabricating images may be generally satisfactory, it would be desirable to provide improved methods and devices for making and using static images.

SUMMARY

Some implementations provide hidden static images. Some such images can only be perceived when viewed from an angle to the normal of a surface. For example, some such images appear as a solid color when viewed along an axis perpendicular to a surface, but reveal a hidden image when viewed from an angle relative to that axis. The hidden image may be defined according to interfaces between optical cavities that pass substantially the same wavelength when viewed along the axis perpendicular to the surface, but which pass noticeably different wavelengths and attenuate other wavelengths when viewed from an angle relative to that axis. Alternative implementations may involve optical cavities configured to pass noticeably different wavelengths when viewed along the axis perpendicular to the surface and to pass substantially the same wavelength when viewed from an angle relative to that axis.

The hidden images may or may not be discernable to a human observer. The hidden image may comprise a code that is not readable by an optical scanner when it is positioned to read along an axis normal to a surface, but that is readable by the optical scanner when it is positioned to read along another axis at an angle to normal.

Some embodiments provide an apparatus that includes a substantially transparent layer, a reflective layer, a first spacer having a first index of refraction and a first thickness, and a second spacer having a second index of refraction and a second thickness. The first spacer may be disposed between a first portion of the substantially transparent layer and a first portion of the reflective layer. The second spacer may be disposed proximate the first spacer and between a second portion of the substantially transparent layer and a second portion of the reflective layer.

A first cavity comprising the first spacer, the reflective layer and the substantially transparent layer may pass a first wavelength of reflected light when viewed along an axis substantially normal to the first portion of the reflective layer. The first cavity may pass a second wavelength of reflected light and attenuate the first wavelength of reflected light when viewed from an angle θ to the axis.

A second cavity comprising the second spacer, the reflective layer and the substantially transparent layer may pass the first wavelength of reflected light when viewed along the normal axis. The second cavity may pass a third wavelength of reflected light and attenuate the first wavelength of reflected light when viewed from the angle θ to the normal axis.

The reflective layer may be continuous or discontinuous, according to the implementation. The apparatus may further comprise an absorber layer disposed between the first spacer and the substantially transparent layer. An absorber layer may be further disposed between the second spacer and the substantially transparent layer.

A difference between the second wavelength and the third wavelength may be perceivable as a chromatic difference to a human observer and/or to a machine.

An interface may be formed by a first edge of the first spacer that is proximate a second edge of the second spacer. The interface may not be discernable to an observer when viewed along the axis, but may be discernable to the observer when viewed from the angle θ to the axis. The interface may form at least part of an image that is visible to a human observer when viewed from the angle θ to the axis but not visible to the human observer when viewed along the axis. The interface may form a portion of a code that is readable by an optical scanner when the optical scanner is positioned to read at the angle θ to the axis. However, the code may not be readable by the optical scanner when the optical scanner is positioned to read along the axis. At least one of the first wavelength, the second wavelength or the third wavelength may be outside a range of wavelengths perceivable to a human observer.

Other embodiments provide an apparatus that includes these elements: a substantially transparent layer; a reflective layer; a first cavity configured for passing a first peak wavelength of light when viewed along an axis perpendicular to a first portion of the reflective layer and for passing a second peak wavelength of light when viewed from an angle θ to the axis; and a second cavity configured for passing the first peak wavelength of light when viewed along the axis and for passing a third peak wavelength of light when viewed from the angle θ to the axis.

The difference between the second peak wavelength and the third wavelength may be perceivable as a chromatic difference to an observer, e.g., to a human observer. However, at least one of the first peak wavelength, the second peak wavelength or the third peak wavelength may be outside a range of wavelengths perceivable to a human observer.

An interface may be formed by a first edge of the first means that is proximate a second edge of the second means. The interface may be discernable to an observer when viewed from the angle θ to the axis, but may not be discernable to the observer when viewed along the axis. The interface may form at least part of an image that is visible to an observer when viewed from the angle θ but not visible to the human observer when viewed along the axis. The interface may form a portion of a code that is readable by an optical scanner when the optical scanner is positioned to read at the angle θ but that is not readable by the optical scanner when the optical scanner is positioned to read along the axis.

Some methods described herein involve the following: forming an absorber layer on a substantially transparent sheet; depositing a first material on the absorber layer in a first area; depositing a second material on the absorber layer in a second area proximate the first area; forming a first reflective surface on the first material; and forming a second reflective surface on the second material. The first reflective surface and the second reflective surface may be continuous or discontinuous, according to the implementation.

The first material has a first index of refraction and a first thickness. The absorber layer, the first material and the first reflective surface may form a first cavity configured to pass a first wavelength of light when viewed along an axis perpendicular to the first reflective surface and to pass a second wavelength of light, and attenuate the first wavelength of light, when viewed from an angle θ to the axis.

The second material has a second index of refraction and a second thickness. The second index of refraction and the second thickness may or may not be different from the first index of refraction and the first thickness. The absorber layer, the second material and the second reflective surface may form a second cavity configured to pass the first wavelength of light when viewed along the axis and to pass a third wavelength of light, and attenuate the first wavelength of light, when viewed from the angle θ to the axis.

Alternative methods may involve the following: forming a first reflective surface on a first area of a substrate; forming a second reflective surface on a second area of the substrate proximate the first reflective surface; depositing a first material on the first reflective surface; depositing a second material on the second reflective surface; applying a first absorber on the first material; and applying a second absorber on the second material.

The first material has a first index of refraction and a first thickness. The absorber layer, the first material and the first reflective surface may form a first cavity configured to pass a first wavelength of light when viewed along an axis perpendicular to the first reflective surface and to pass a second wavelength of light, and attenuate the first wavelength of light, when viewed from an angle θ to the axis.

The second material has a second index of refraction and a second thickness. The second index of refraction and the second thickness may or may not be different from the first index of refraction and the first thickness. The absorber layer, the second material and the second reflective surface may form a second cavity configured to pass the first wavelength of light when viewed along the axis and to pass a third wavelength of light, and attenuate the first wavelength of light, when viewed from the angle θ to the axis.

Forming the first reflective surface and the second reflective surface may involve forming a continuous reflective layer or a discontinuous reflective layer on the first area and the second area of the substrate. Applying the first absorber and the second absorber comprises applying a continuous absorber layer or a discontinuous absorber layer on the first material and the second material.

Some embodiments of the present invention provide hardware that is configured to perform the methods of the invention. Some implementations of the invention provide software stored on computer-readable media, the software including instructions for controlling devices to perform these and other methods. These and other features of the present invention will be presented in more detail in the following detailed description of the invention and the associated figures.

DETAILED DESCRIPTION

Figure 1A:
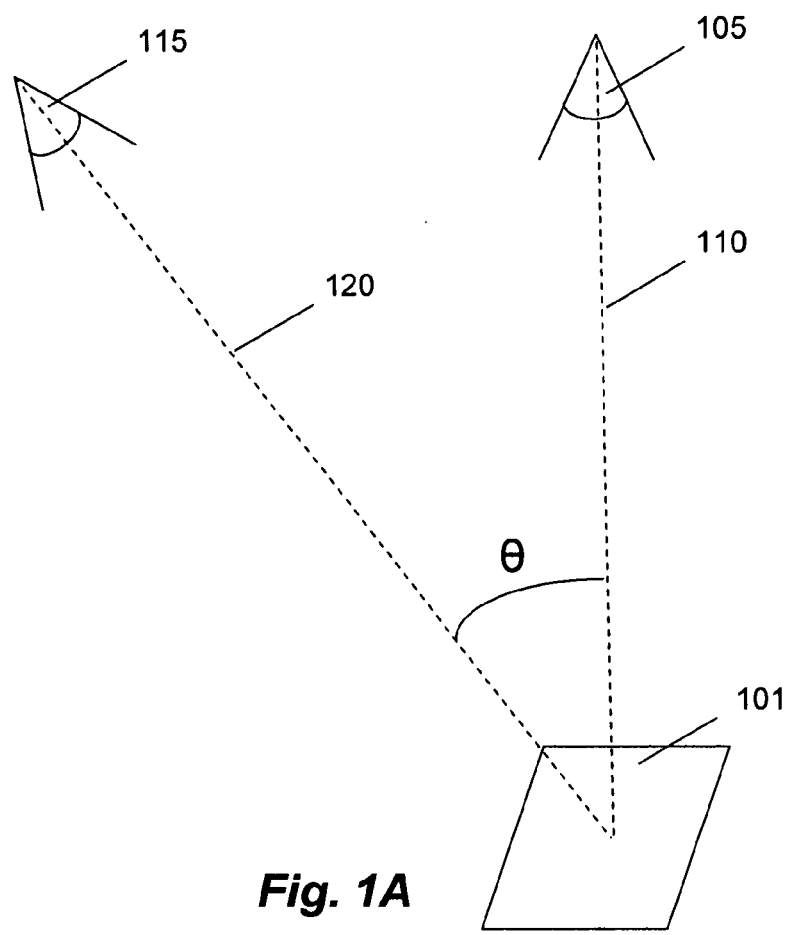
FIG. 1A illustrates a sheet having a hidden image formed thereon being viewed from two positions.

In this application, numerous specific details are set forth in order to provide a thorough understanding of the present invention. However, the present invention may be practiced without some or all of these specific details. In some instances, well known process steps have not been described in detail.

One example of a hidden image according to some implementations will now be described with reference to FIGS. 1A and 1B. When sheet 101 is viewed from position 105, along axis 101 that is perpendicular to sheet 101, no image is apparent. This condition is shown by the apparently blank sheet 101a in FIG. 1B.

However, when sheet 101 is viewed from position 115, along axis 120 that is θ degrees from axis 110, hidden image 125 may be seen by a viewer or imaging device. Hidden image 125 is revealed to the viewer and may appear to the viewer as depicted on sheet 101b of FIG. 1B. In this example, areas 130 appear as a first color, areas 135 appear as a second color and background area 140 appears as a third color. Interfaces 145 between these areas define hidden image 125.

Figure 2A:
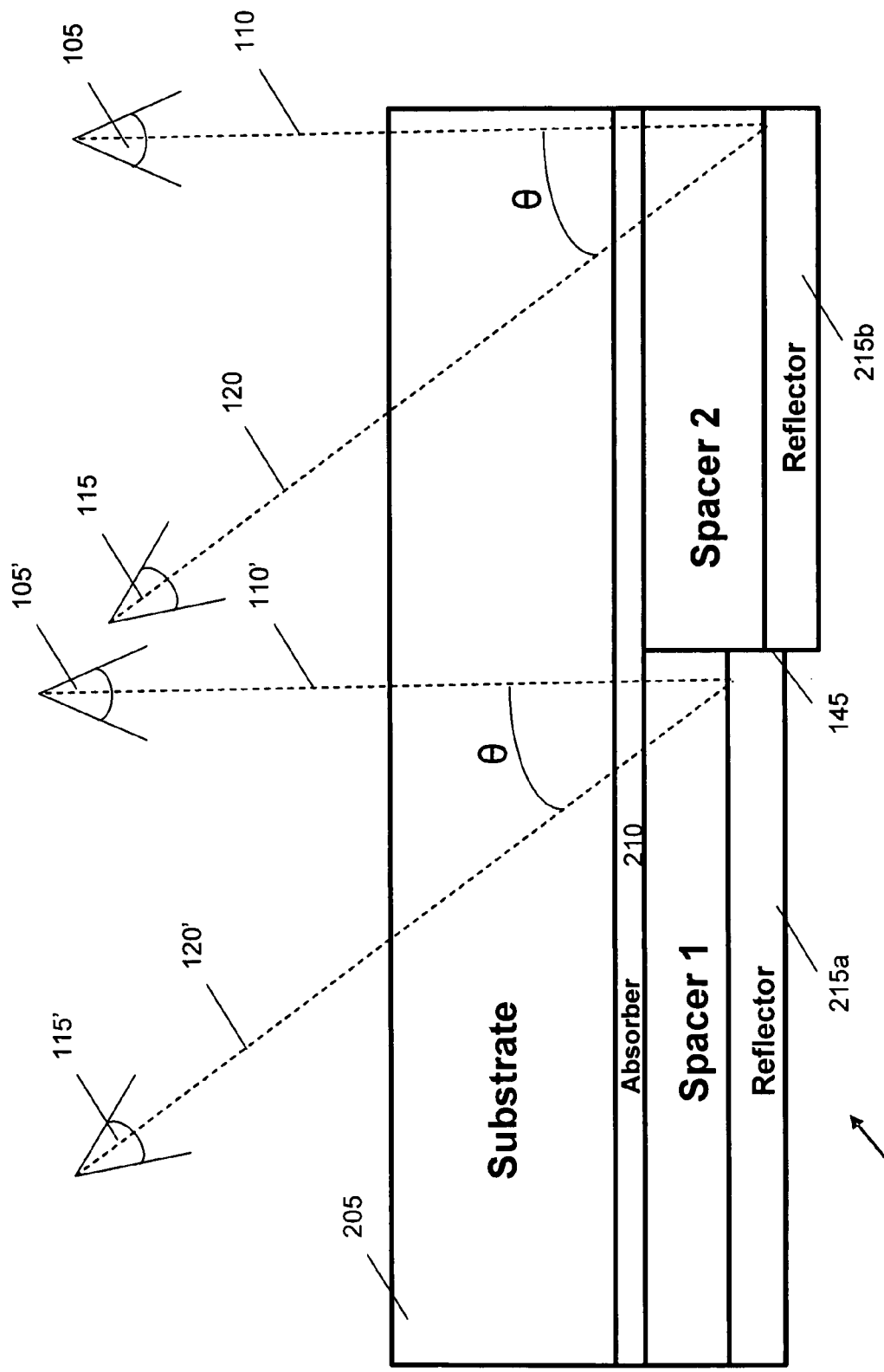
FIG. 2A illustrates one example of thin film stacks that may be used to form a portion of a hidden image.

FIG. 2A provides one example of thin film stacks that may be used to produce a portion of a hidden image. Stack 200 includes substrate 205, which is formed of substantially transparent material such as glass, plastic, etc.

Spacer 1 has an index of refraction $n_1$ and spacer 2 has an index of refraction $n_2$. Spacers 1 and 2 may be formed of various substances, such as air, transmissive dielectrics, etc. Some examples of the latter include, but are not limited to, $SiO_2$, $AlO_x$, $SiO_2$ and $Si_3N_4$. In some implementations, $n_1$ differs substantially from $n_2$.

However, in some embodiments $n_1$ is substantially the same as $n_2$. In some such embodiments, spacers 1 and 2 are formed from the same material, but each has a different thickness. Examples of some such embodiments are described below with reference to FIG. 9B.

Reflectors 215a and 215b are formed of a highly reflective material, such as aluminum, gold, tin, silver, or other metals, and may be formed of or include dielectric mirrors. In this example, reflectors 215a and 215b are discontinuous. However, in some such implementations (such as the embodiment depicted in FIG. 2B), reflective layer 215 may be continuous.

Absorber 210 is partially reflective and partially transmissive and partially absorptive. The thickness and material for absorber 210 are chosen so that absorber 210 allows ambient light received from substrate 205 to pass through spacers 1 and 2 and vice versa, but yet reflects a portion of the light that has reflected from reflectors 215a and 215b. Absorber 210 may be formed, for example, from MoCr ("molychrome," an alloy of molybdenum and chromium), Cr, Ti, Ta, W, or any other suitable material.

Some embodiments do not include an absorber layer. For example, some embodiments provide dichroic stacks, which are interferometric stacks with no absorbers.

However, in this example, a first optical cavity is formed by reflector 215a, spacer 1 and absorber 210. In this example, the first optical cavity corresponds with a portion of area 135 of FIG. 1B. A second optical cavity is formed by reflector 215b, spacer 2 and absorber 210. Here, the second optical cavity corresponds with a portion of area 130 of FIG. 1B. Interface 145 delineates a separation zone between area 130 and area 135. In some embodiments, the separation zone is sharp such that there is little or no overlap between area 130 and area 135, while in other embodiments the separation zone is diffuse such that there is a gradual transition between area 130 and area 135.

As in FIGS. 1A and 1B, a comparison will be made in various embodiments between what is observed from position 105, along axis 110 that is perpendicular to reflector 215b, and what is observed from position 115, along axis 120 that is at least 0 degrees from axis 110. As shown below with respect to FIGS. 3-5 there is a range of angles or viewing cone within which an image may be perceived: below a certain theta the image is hidden, within a certain range of thetas the image is apparent, but above a certain theta the image is not viewable (e.g., as theta approaches 90 degrees). For example, as described in more detail below, in some implementations a chromatic difference between areas of a hidden image may not be discernable when viewed along an axis parallel to axis 110, but may be discernable when viewed along an axis parallel to axis 120.

Positions 105 and 115 and the corresponding axes 110 and 120 are shown separately in FIG. 2A from positions 105' and 115' and the corresponding axes 110' and 120'. This distinction is made in FIG. 2A for the purpose of illustrating how light is affected by traveling through spacer 1 and spacer 2 along different paths. Axis 110' is perpendicular to reflector 215a and axis 120' is θ degrees from axis 110'. In this example, axis 110 is substantially parallel to axis 110', though this is not necessarily true in all implementations and/or viewing distances.

The reader should bear in mind, however, that FIG. 2A is not drawn to scale. In practice, positions 105 and 115 of the viewer may be much further away from stack 200 than is suggested by the scale of FIG. 2A.

Figure 1B:
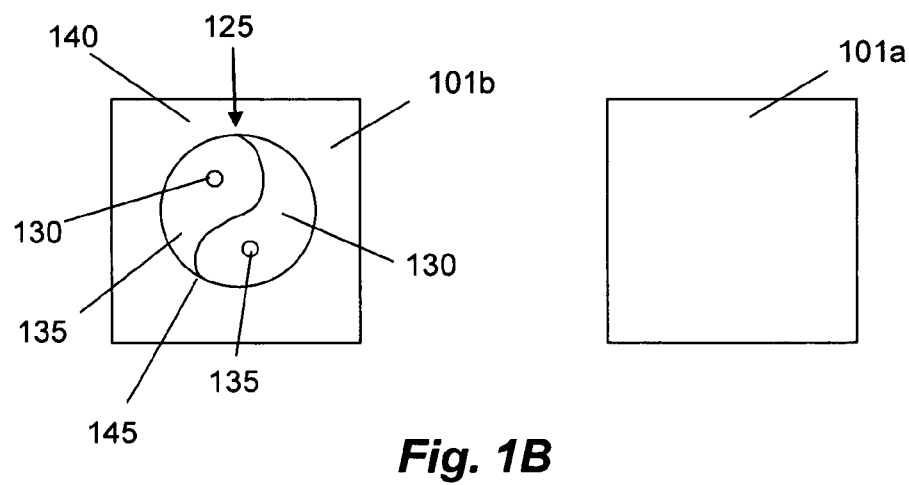
FIG. 1B illustrates what a viewer would observe when observing the sheet of FIG. 1A from the two positions indicated.

As depicted in FIG. 1A, at such distances, an observer at position 105 could simultaneously view light that is arriving along axis 110 and axis 110'. Similarly, an observer at position 115 could simultaneously view light that is arriving along axis 120 and axis 120'.

Preferably, the materials and/or thicknesses of spacers 215 and 220 are selected such that $\lambda_{d1}$, the peak wavelength reinforced by the first optical cavity that includes spacer 1, is approximately the same as $\lambda_{d2}$, the peak wavelength reinforced by the second optical cavity that includes spacer 2, for light that is reflecting along axis 110 and axis 110'. In some such implementations, areas 130 and 135 will appear to be approximately the same color when observed along axes 110 and 110'. Interface 145 will not be distinguishable in some embodiments.

The materials and/or thicknesses of spacers 215 and 220 are selected such that $\lambda_{d1}$ is substantially different from $\lambda_{d2}$ for light that is reflecting along axis 120 and axis 120'. In some such implementations, a human observer will detect a chromatic difference between areas 130 and 135 when viewing stack 200 along axis 120 and axis 120', and interface 145 will be distinguishable. As the viewing angle changes, the peak wavelength that is reinforced by the first optical cavity changes at a different rate from the peak wavelength that is reinforced by the second optical cavity.

Figure 2B:
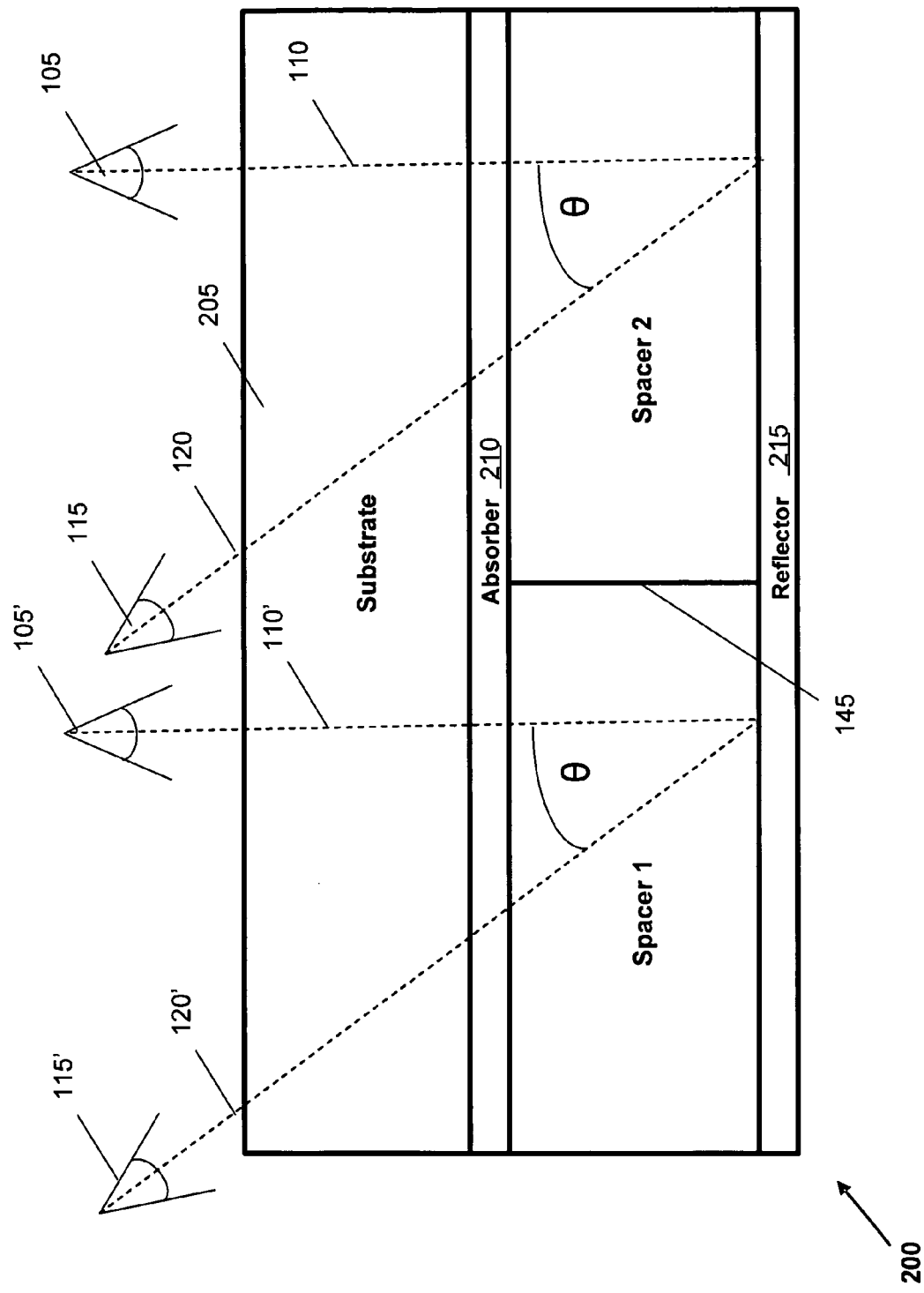
FIG. 2B illustrates another example of thin film stacks that may be used to form a portion of a hidden image.

As shown in FIG. 2B, in some implementations this change may be produced entirely by a difference in refractive indexes between spacer 1 and spacer 2. In such implementations, the thickness of spacer 1 and spacer 2 may be substantially the same.

Figure 3:
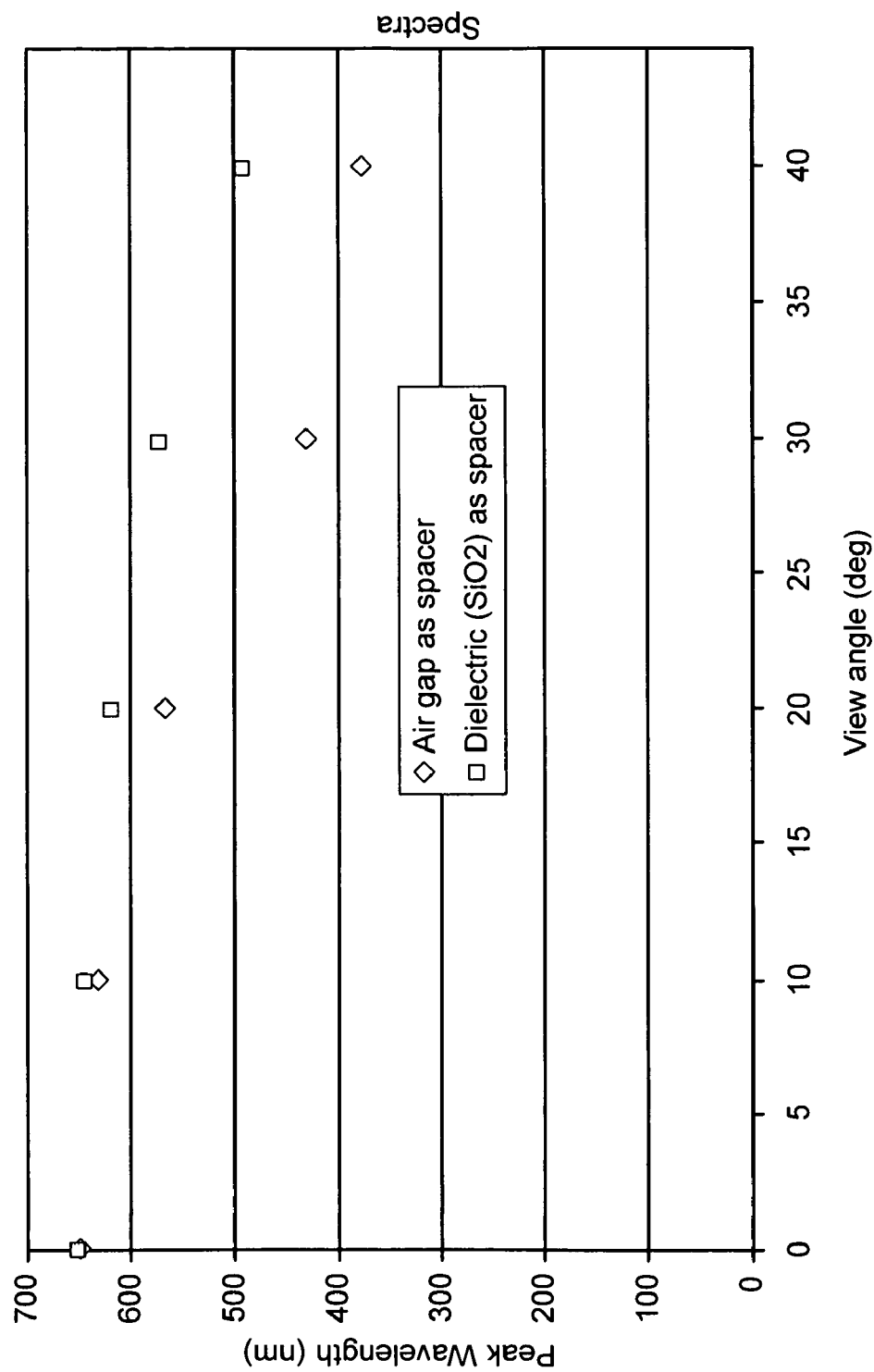
FIG. 3 is a graph of viewing angle versus peak wavelength for two examples of spacer material in the thin film stacks of FIGS. 2A and/or 2B.

FIG. 3 is a graph that indicates the simulated change in peak wavelength as a function of viewing angle for one embodiment wherein spacer 1 is air and spacer 2 is $SiO_2$. In this example, the thickness of spacer 1 is 3060 Å and the thickness of spacer 2 is $SiO_2$ is 2060 Å. At a viewing angle of about zero degrees (corresponding to viewing along axis 110 or 110' of FIG. 2A or FIG. 2B), the peak wavelength reinforced by a first optical cavity formed with the air gap (corresponding to area 130 in this example) is substantially the same as the peak wavelength reinforced by a second optical cavity formed with $SiO_2$ (here, corresponding to area 135). In this example, the peak wavelength at about zero degrees is about 650 nanometers (nm), which corresponds to a red color. Other wavelengths are attenuated, to varying degrees.

Accordingly, a human or machine observer with a normal ability for color perception would perceive areas 130 and 135 as being a continuous red area. (When a "human observer" or the like is referred to herein, such expressions will reference a human observer with a normal ability for color perception [e.g., not colorblind] unless otherwise indicated.) Interface 145 would not be visible.

In this example, $\lambda_{air}$ is the peak wavelength for the first optical cavity, whereas $\lambda_d$ is the peak wavelength for the second optical cavity. The size of the air gap in the first optical cavity is $d_{air}$. The index of refraction of the dielectric is $n_d$. Accordingly, $\lambda_{air}$ is proportional to $d_{air} \sin \theta$. Similarly, $\lambda_d$ is proportional to $d_{air}/n_d \sin \theta$. When the viewing angle θ is zero, we want $\lambda_{air}$ to equal $\lambda_d$, as noted above.

Accordingly, the change in the peak wavelength for the first optical cavity may be expressed as:

$$d\lambda_{air} \propto d_{air} \cos \theta d\theta. \qquad \text{(Equation 1)}$$

Similarly, the change in the peak wavelength for the second optical cavity may be expressed as:

$$d\lambda_d \propto d_{air}/n_d \cos \theta d\theta. \qquad \text{(Equation 2)}$$

As the viewing angle increases, the peak wavelength passed by the first optical cavity changes more rapidly than the peak wavelength passed by the second optical cavity. At or beyond a threshold viewing angle, a chromatic difference between the first and second optical cavities will appear to the human observer.

When the viewing angle reaches 20 degrees, for example, the peak wavelength for the first optical cavity is approximately 575 nm, which is in the yellow range, whereas the peak wavelength for the second optical cavity is about 620 nm, which is in the orange range. Some human viewers may be able to detect this chromatic difference. At a viewing angle of 40 degrees, the peak wavelength for the first optical cavity is approximately 380 nm, which may appear as a dark violet, whereas the peak wavelength for the second optical cavity is about 490 nm, which is in the blue/green range. At some viewing angle θ between 20 and 40 degrees, most human viewers would be able to detect a chromatic difference between area 130 and 135, and would also detect a difference in color at the interface 145.

Figure 4:
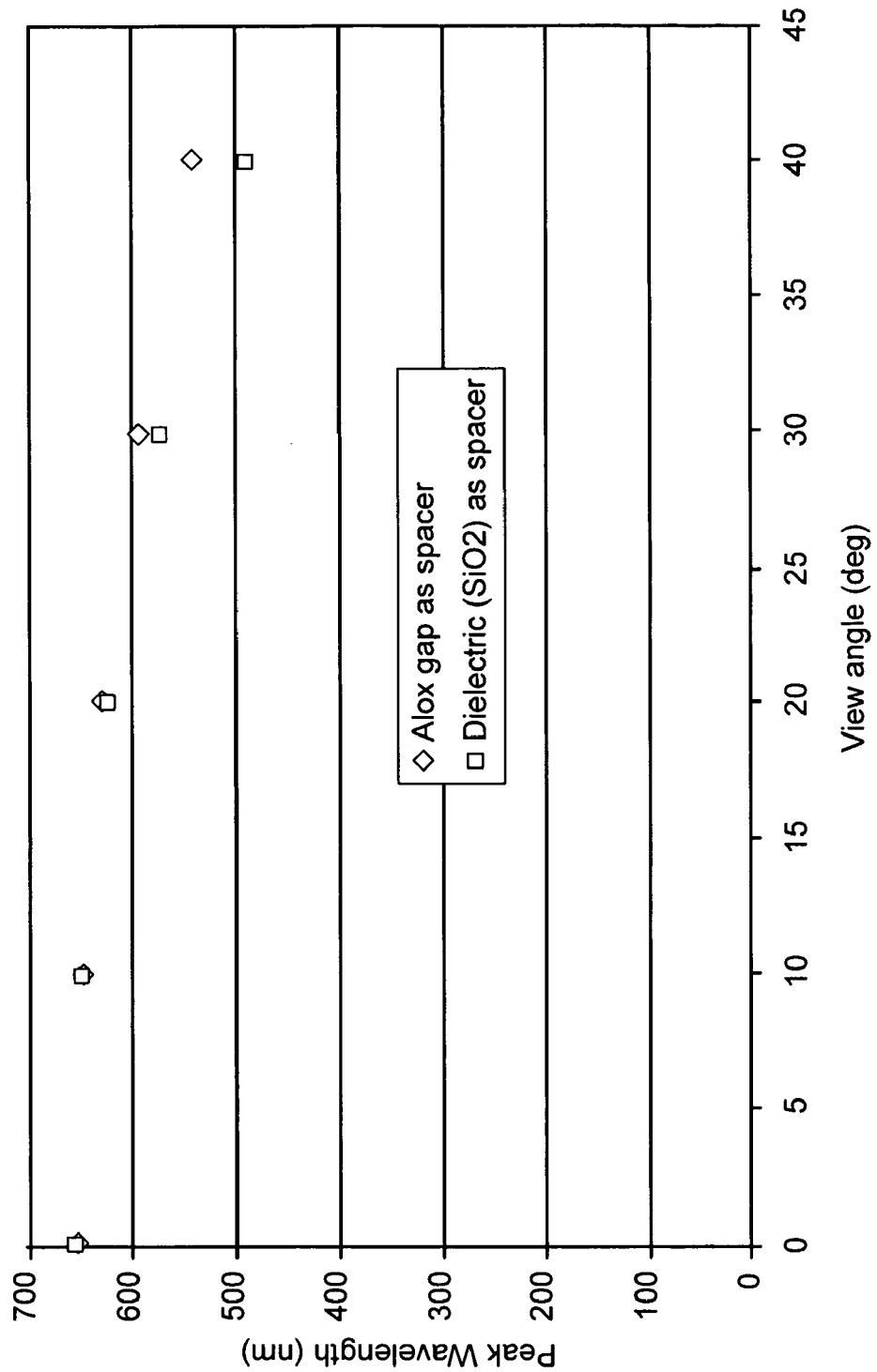
FIG. 4 is a graph of viewing angle versus peak wavelength for other examples of spacer material in the thin film stacks of FIGS. 2A and/or 2B.

A second example is provided by simulation results shown in the graph of FIG. 4. Here, spacer 1 is made of $AlO_x$ and spacer 2 is formed of $SiO_2$. In this example, spacer 1 is approximately 340 nm thick and spacer 2 is approximately 390 nm thick. Absorber 210 is formed of MoCr and reflector 215 is made of Al.

In this example, the differences in the rates of color shift as a function of viewing angle are not as great as those depicted in the previous example. Nonetheless, when the viewing angle reaches 30 degrees, the peak wavelength for the first optical cavity that includes the $AlO_x$ spacer is slightly less than 600 nm, which is in the yellow/orange range, whereas the peak wavelength for the second optical cavity formed with $SiO_2$ is about 570 nm, which is in the yellow range. Some human viewers may be able to detect this chromatic difference.

The apparent chromatic difference depends on the viewing distance and/or size of the areas. For example, if areas 130 and 135 are as small as subpixels and intermixed, then at an arm's length there may be an overall color shift whereby the individual subpixels' color blends together. However, if the areas are each large enough relative to the viewing distance, e.g., 1" squares at an arm's length, the chromatic difference may be easily noticeable because the eye can resolve the separate color blocks.

At a viewing angle of 40 degrees, the peak wavelength passed by the first optical cavity spacer is approximately 545 nm, which is in the green range. The peak wavelength passed by the second optical cavity is about 490 nm, which is in the blue/green range. Other wavelengths are attenuated. At some viewing angle θ between 30 and 40 degrees, many human viewers would be able to detect a chromatic difference between area 130 and 135, and would also detect interface 145.

Figure 5:
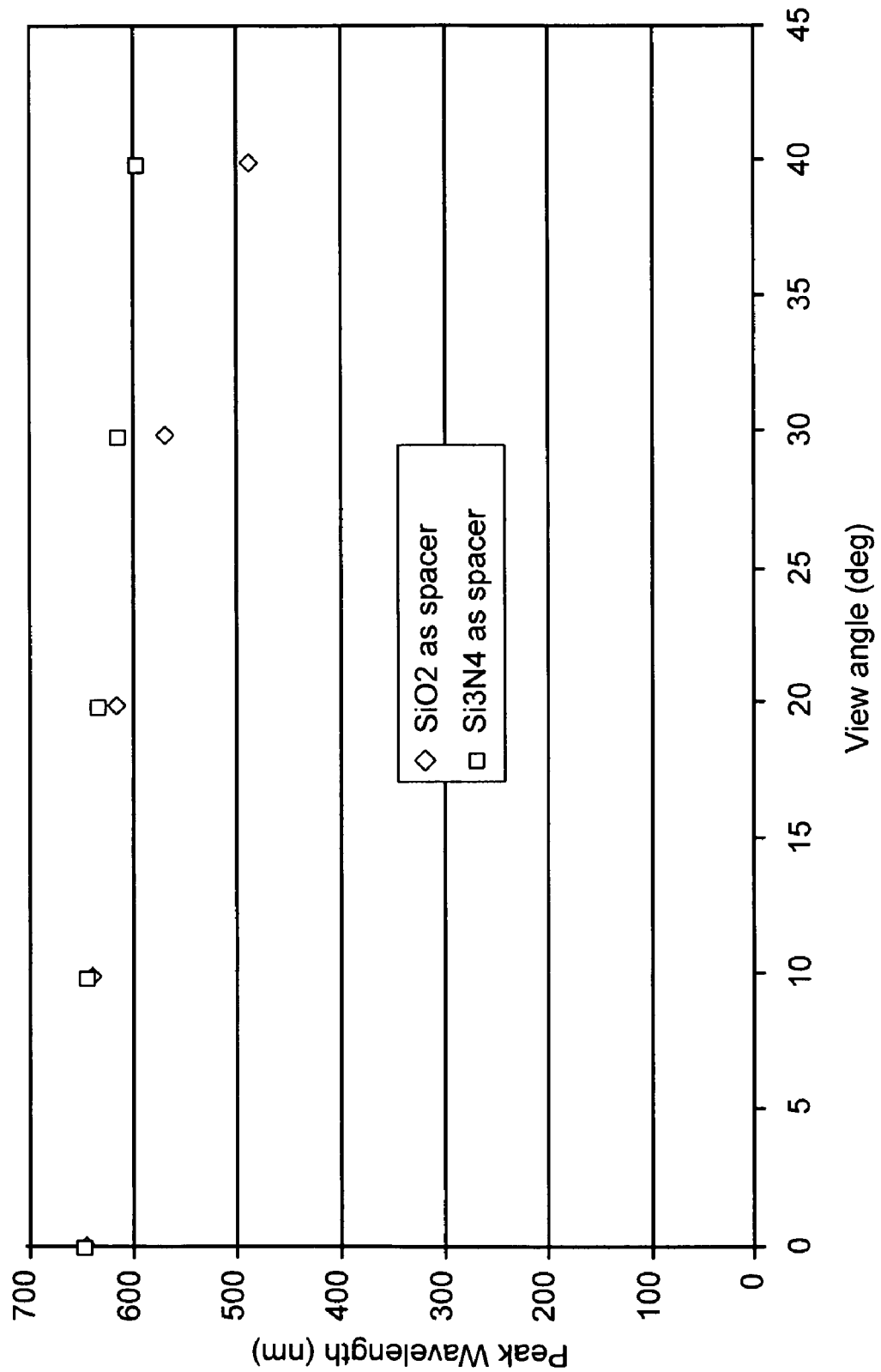
FIG. 5 is a graph of viewing angle versus peak wavelength for still other examples of spacer material in the thin film stacks of FIGS. 2A and/or 2B.

The rates of simulated color shift for a third example are shown in FIG. 5. In this example, spacer 1 is approximately 203 nm thick and spacer 2 is approximately 142 nm thick. Here, spacer 1 is made of $SiO_2$ and spacer 2 is made of $Si_3N_4$. Absorber 210 is formed of MoCr and reflector 215 is made of Al.

In this example, the differential rate of color shift as a function of viewing angle is somewhat greater than that depicted in the previous example. When the viewing angle reaches 30 degrees, the peak wavelength passed by a first optical cavity that includes the $Si_3N_4$ spacer is approximately 620 nm, which is in the orange range, whereas the peak wavelength passed by a second optical cavity formed with $SiO_2$ is about 570 nm, which is in the yellow range. Some human viewers may be able to detect this chromatic difference.

At a viewing angle of 40 degrees, the peak wavelength passed by the first optical cavity is slightly less than 600 nm, which is in the orange range. The peak wavelength passed by the second optical cavity formed with $SiO_2$ is about 490 nm, which is in the blue/green range. This chromatic difference should be easily detectable to a machine observer or human with normal color perception. At some viewing angle θ between 30 and 40 degrees, most human viewers would be able to detect a chromatic difference between area 130 and 135, and would detect a color change at interface 145.

Some implementations provide hidden images that may not be detectable by a human observer at any viewing angle. In some such implementations, one or more of the peak wavelengths may be outside the range of wavelengths that a human observer can perceive. Such implementations may nonetheless be useful, e.g. if the image is detectable by a machine device at some viewing angle.

Figure 6A:
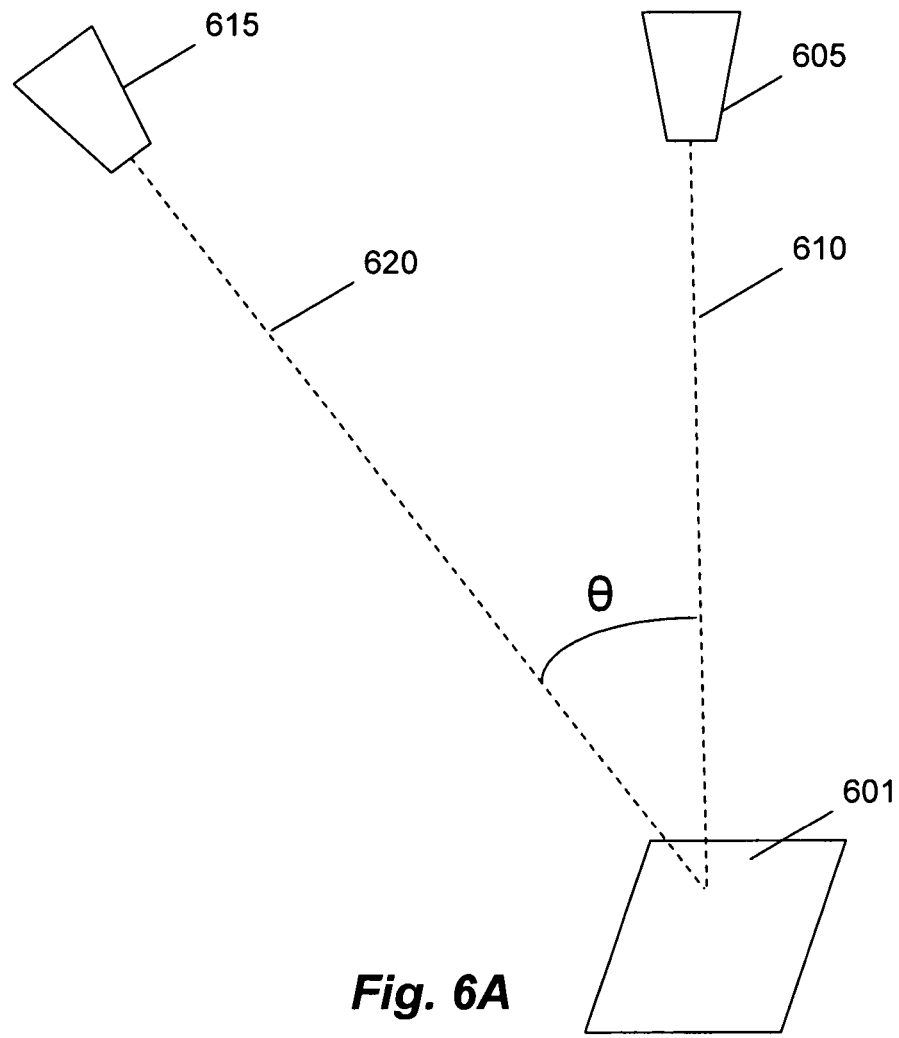
FIG. 6A illustrates a sheet having a hidden image formed thereon being scanned by an optical scanner from two positions.
Figure 6B:
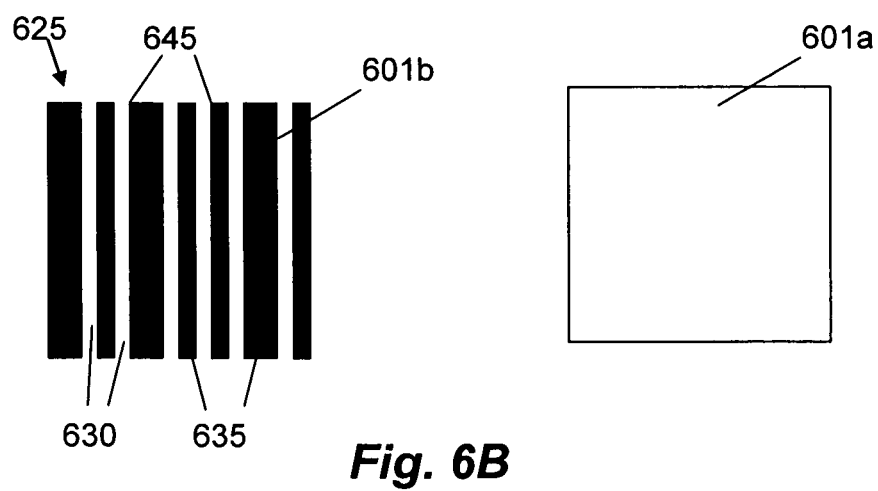
FIG. 6B illustrates what the optical scanner would detect when scanning the sheet of FIG. 6A from the two positions indicated.

One example is provided in FIGS. 6A and 6B. In this example, when optical scanner 600 is in position 605, optical scanner 600 is oriented to scan along axis 610. When optical scanner 600 is in position 615, optical scanner 600 is oriented to scan along axis 620, which is at an angle θ relative to axis 610. As in the previous examples, axis 610 is perpendicular to sheet 601, on which hidden image 625 has been formed.

When optical scanner 600 is oriented to scan along axis 610, hidden image 625 is not readable by the optical scanner. (See 601a.) However, when optical scanner 600 is oriented to scan along axis 620, areas 630 are distinguishable from areas 635. (See 601b.) Interfaces 645 between areas 630 and 635 hidden image 625 can be detected. Accordingly, hidden image 625 is readable by the optical scanner.

In this example, areas 630 and 635, along with interfaces 645, define a bar code. Here, the peak wavelengths that are reinforced in areas 630 and 635 are outside the range of wavelengths perceivable by a human observer. Therefore, the bar code is not detectable by a human, regardless of the orientation of sheet 601. In alternative implementations, the peak wavelengths that are reinforced in areas 630 and 635 may be within the range of wavelengths perceivable by a human observer.

Some methods of fabricating thin film stacks that include hidden images will now be described with reference to FIGS. 7 through 10. As with other examples described herein, there are a large number of variations that are possible but yet still provide benefits described herein. The steps of these methods are not necessarily performed in the order indicated. Some implementations may involve additional steps, whereas some implementations may omit indicated steps.

Figure 7:
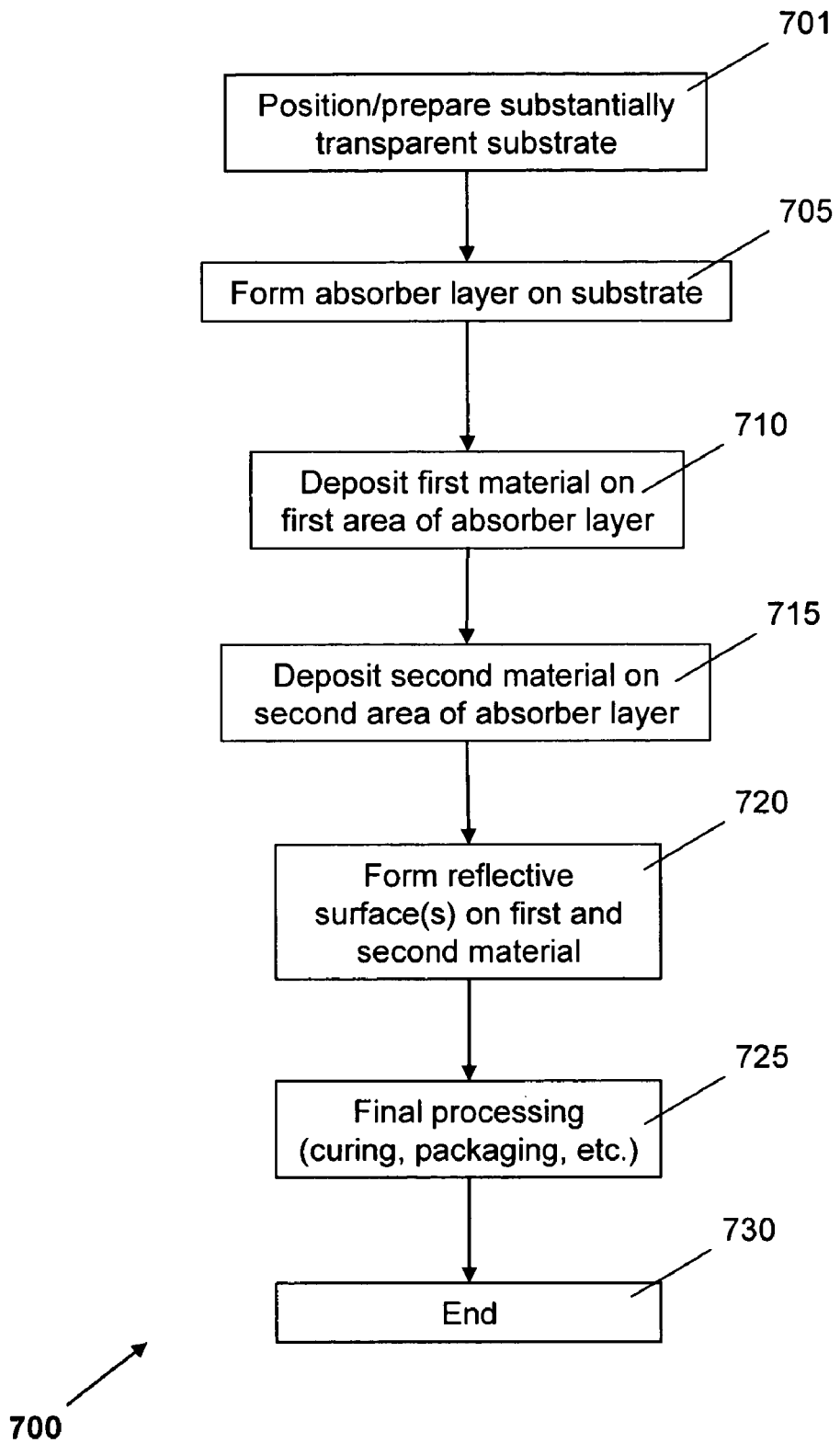
FIG. 7 is a flow chart that outlines steps of forming a stack that includes a hidden image.

FIG. 7 depicts the steps of method 700, which outline some processes of forming thin film stacks with hidden images on a substantially transparent substrate. The substrate may be any suitable material, such as glass, acrylic, plastic, etc. In step 701, the substrate is prepared (e.g., cleaned and dried, if necessary) and positioned for the next step.

In this example, the substrate is a sheet of plastic and the steps of method 700 are performed in the context of roll-to-roll processing, including shadow masking or the like. However, a similar process may be followed for other manufacturing techniques, e.g., those involving separate substantially transparent substrates, such as sheets of glass, separate sheets of plastic, etc. Some such techniques may involve other types of manufacturing processes, such as embossing (e.g., to form optical cavities in a substrate), semiconductor processing techniques (such as etching, sputtering, chemical vapor deposition, etc.), selective laser sintering methods, etc.

Figure 8A:
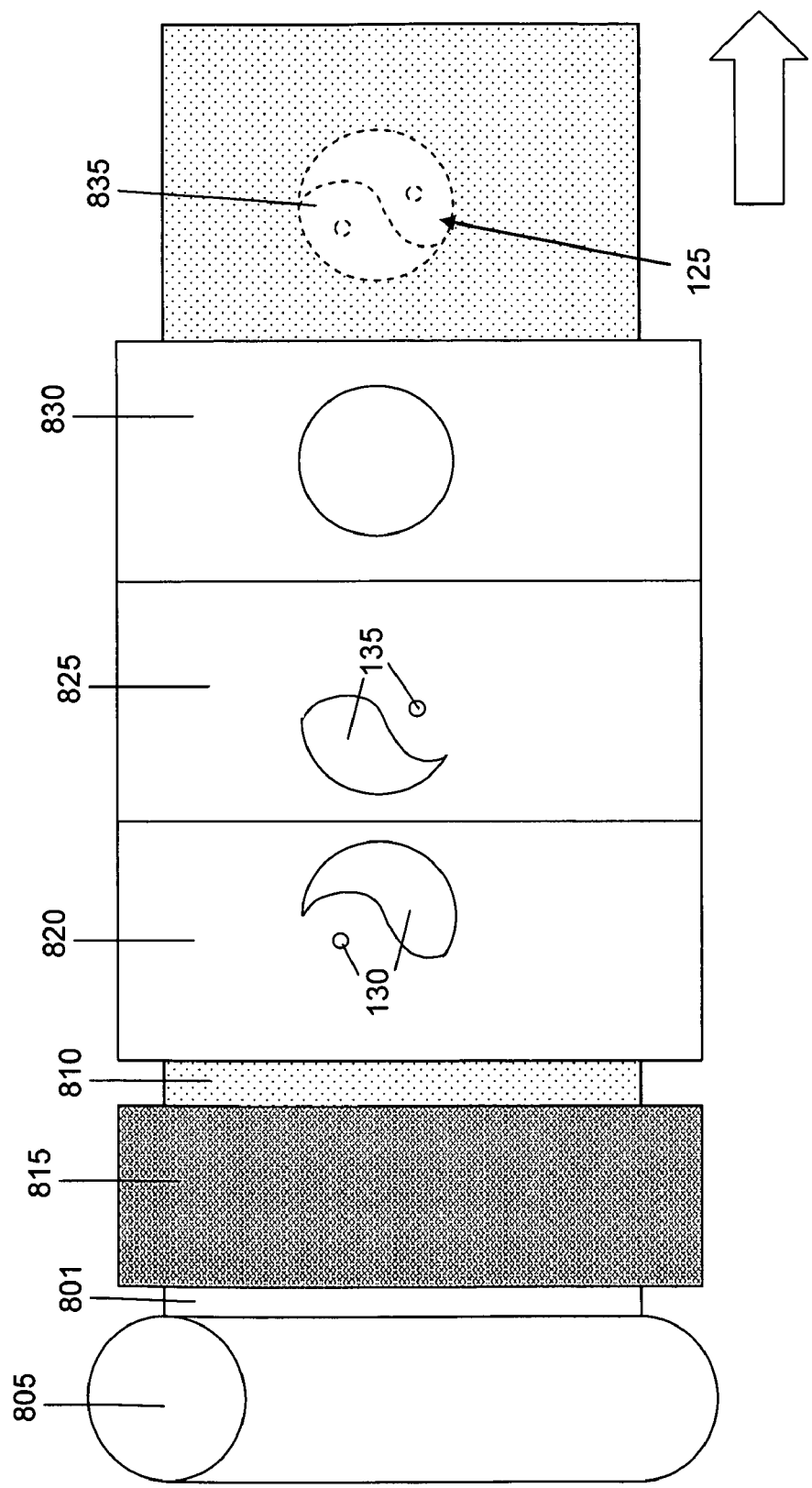
FIGS. 8A and 8B are schematic diagrams of roll-to-roll fabrication processes.
Figure 8B:
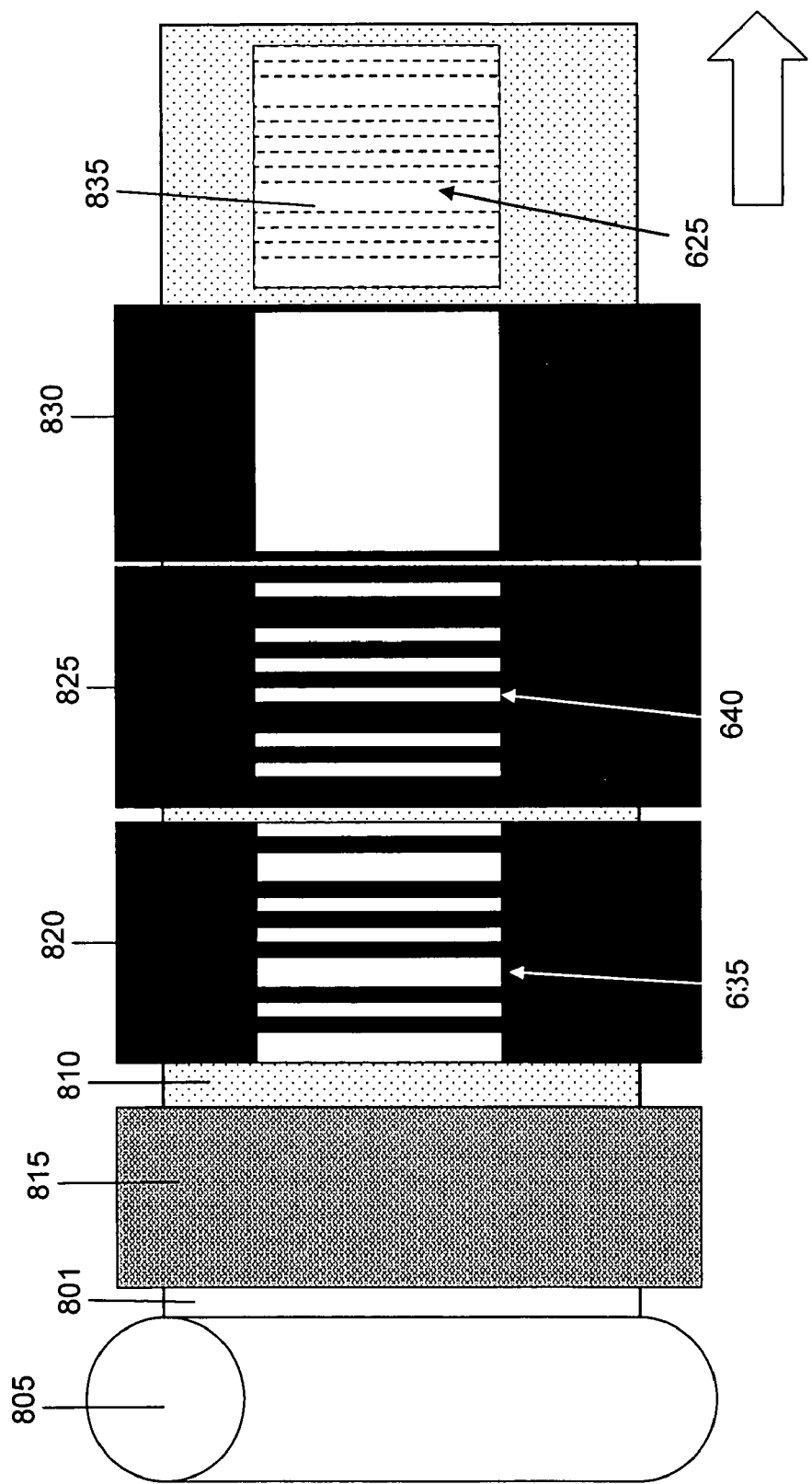

FIGS. 8A and 8B indicate simplified examples of forming thin film stacks with hidden images by using roll-to-roll processing. In these examples, only a single thin film stack and a single hidden image are formed at one time. In practice, it is contemplated that many instances of such stacks (and in some instances different types of stacks) would generally be fabricated at a time.

Examples of the steps shown in FIG. 7 will first be provided by reference to FIG. 8A, so both figures will be referenced in the following discussion. Referring first to FIG. 8A, plastic sheet 801 is provided and positioned by unrolling sheet 801 from roll 805. (Step 701.) An absorber layer 810 is then formed on the substrate. (Step 705.) Here, absorber 810 is formed of MoCr. Other suitable absorber materials include Cr, Mo, Ti, Ta, W, Al and Si, and combinations thereof. Some absorber thicknesses are in the 40 Å to 200 Å range, although other absorber thicknesses may be used.

Here, the absorber 810 is shown covering the surface of sheet 801. In this example, absorber may be applied by PVD or sputtering of a MoCr target, e.g., with a shadow mask to cause deposition only where so desired and prevent deposition elsewhere. Alternatively, absorber material may be applied to sheet 801 in a manner similar to that used by computer printers. Here, absorber application device 815 includes a plurality of nozzles, each of which may be configured to form precise amounts of absorber 810 onto sheet 801. Alternative implementations apply absorber 810 using techniques that are broadly similar to those employed in thermal transfer printing, laser printing, etc.

Some implementations may involve applying absorber 810 to localized areas of sheet 801, e.g., in order to reduce material costs. In some such implementations, droplets of absorber 810 may carry a slight electrical charge. The placement of absorber 810 on sheet 801 may be determined by the charge of a cathode and electrode between which the absorber 810 moves towards sheet 801.

Spacer deposition modules 820 and 825 are used to deposit spacer material (e.g., dielectric material) in first and second areas 130 and 135 (FIG. 1) of the absorber layer. (See steps 710 and 715 of FIG. 7.) Here, a first dielectric material is applied to form spacer 1 in areas 130 and a second dielectric material is applied to form spacer 2 in areas 135. In this example, spacer 1 is made of $SiO_2$ and spacer 2 is made of $Si_3N_4$.

In this implementation, spacer 1 is formed in a substantially uniform thickness of approximately 203 nm and spacer 2 is formed in a substantially uniform thickness of approximately 142 nm. Here, spacer 1 and spacer 2 deposition modules 820 and 825, respectively, spray on the dielectric material, allow it to harden and then remove excess material (e.g. by wet or gas phase etching, or chemical-mechanical planarization for relatively more durable substrates 801, e.g., glass substrates 801). However, any suitable method for depositing dielectric material of a desired type, planar orientation in the appropriate areas 130 and 135, and thickness may be used.

Reflector applicator 830 then applies a reflective coating 835 to the dielectric material. (See step 720 of FIG. 7.) Reflective coating 835 may be any of various reflective materials, e.g., a reflective metal such as aluminum, gold, silver, dielectric mirrors, etc. Moreover, any suitable method for applying reflective coating 835 may be used. For example, a thin-film deposition method, such as an evaporation or chemical or physical vapor deposition method, may be used to apply reflective coating 835 to the dielectric material.

Step 725 of FIG. 7 involves any final processing steps that may be required. For example, the stack may be rolled up with a plurality of other stacks on sheet 801, may be cut or otherwise separated from the rest of sheet 801, may be trimmed, packaged, cured, etc. The process ends in step 730.

A similar roll-to-roll process is depicted in FIG. 8B. As before, absorber 810 is applied to sheet 801. Spacer deposition modules 820 and 825 are used to deposit spacer material in first and second areas of the absorber layer. Here, a first spacer is formed in areas 635 and a second spacer is formed in areas 640. A reflector 835 is then applied. Accordingly, the resulting stack includes hidden image 625, which is a bar code in this example.

Figure 9A:
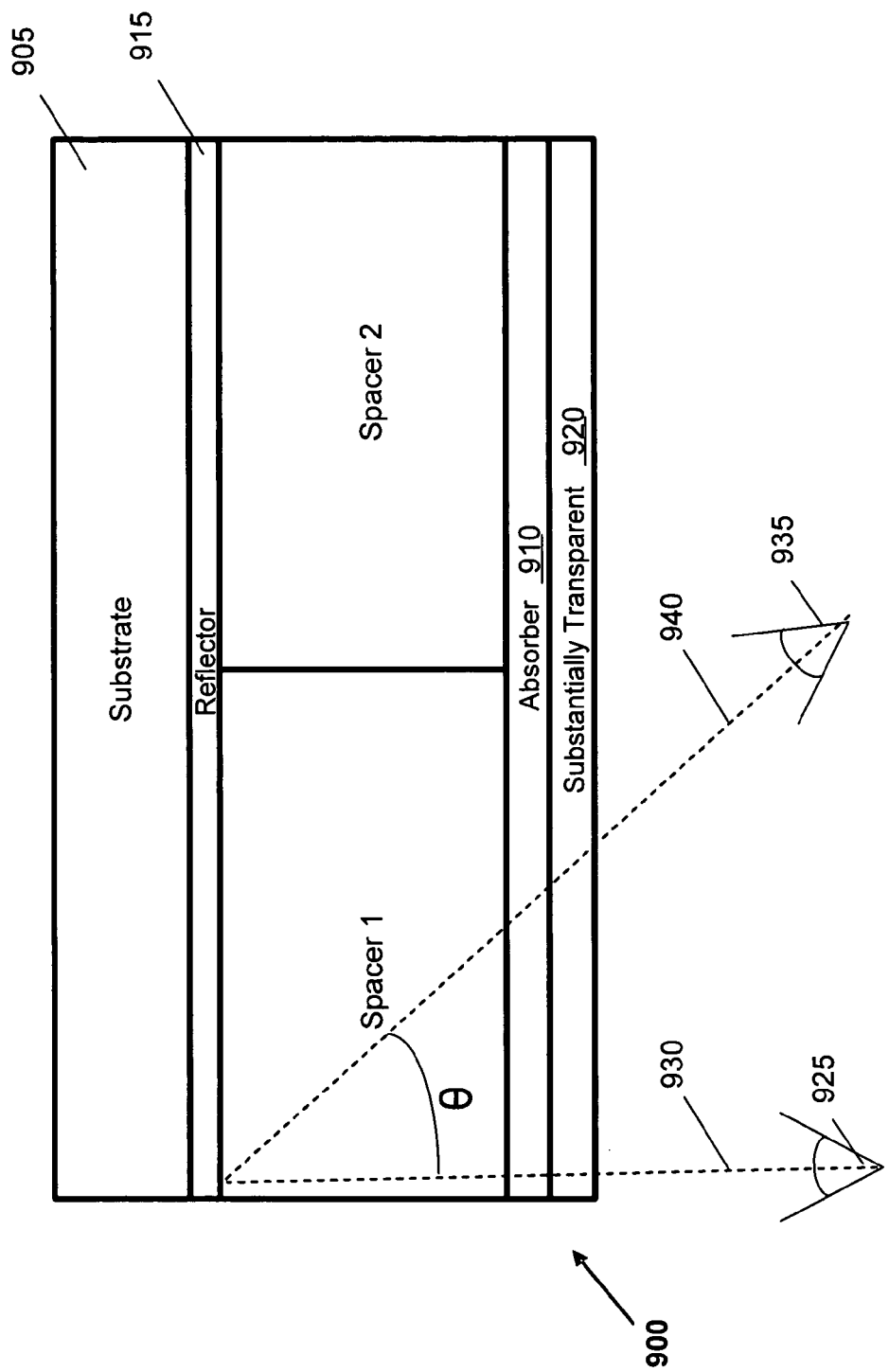
FIG. 9A illustrates yet another example of thin film stacks that may be used to form a portion of a hidden image.
Figure 9B:
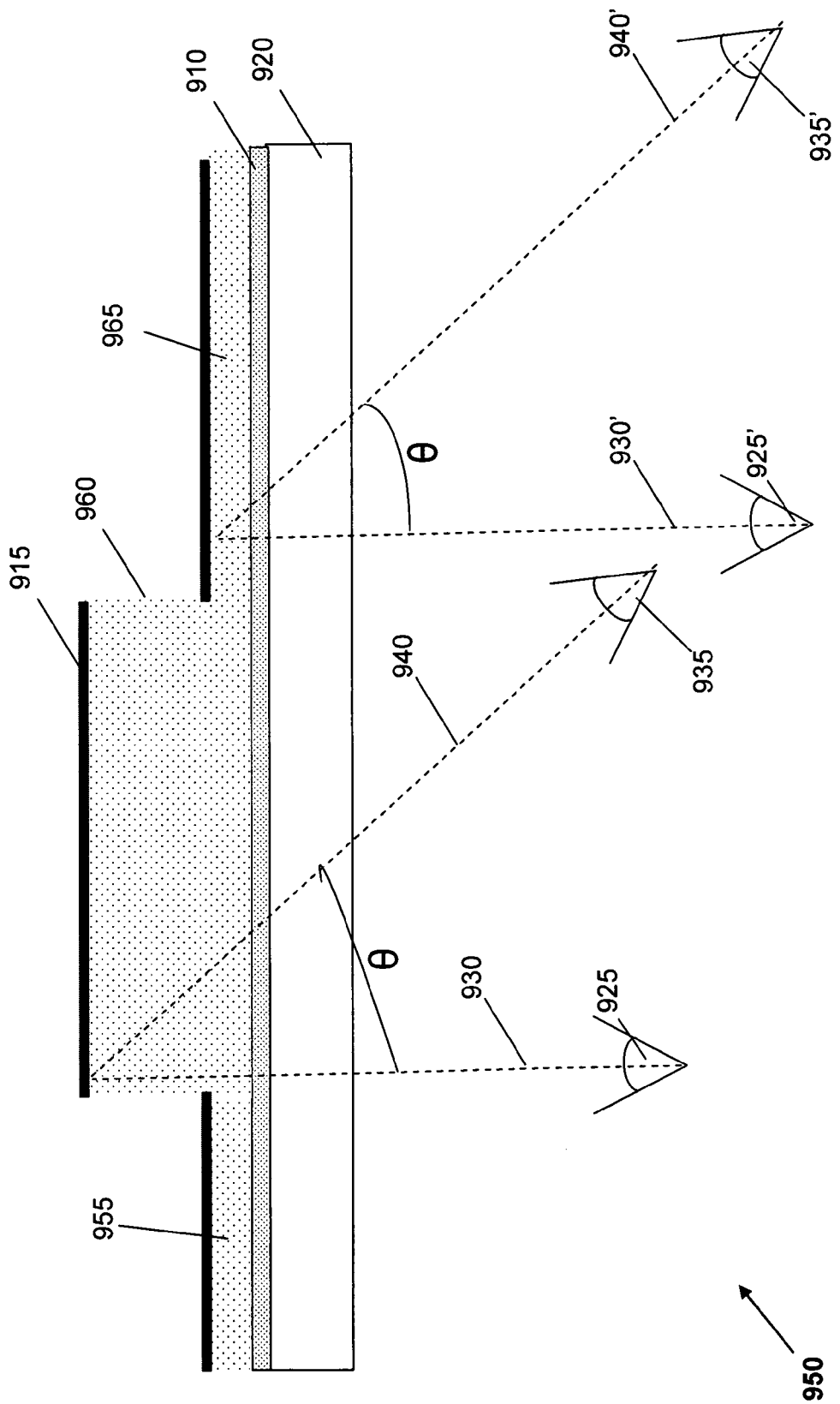
FIG. 9B illustrates another example of thin film stacks that may be used to form a portion of a hidden image.
Figure 10:
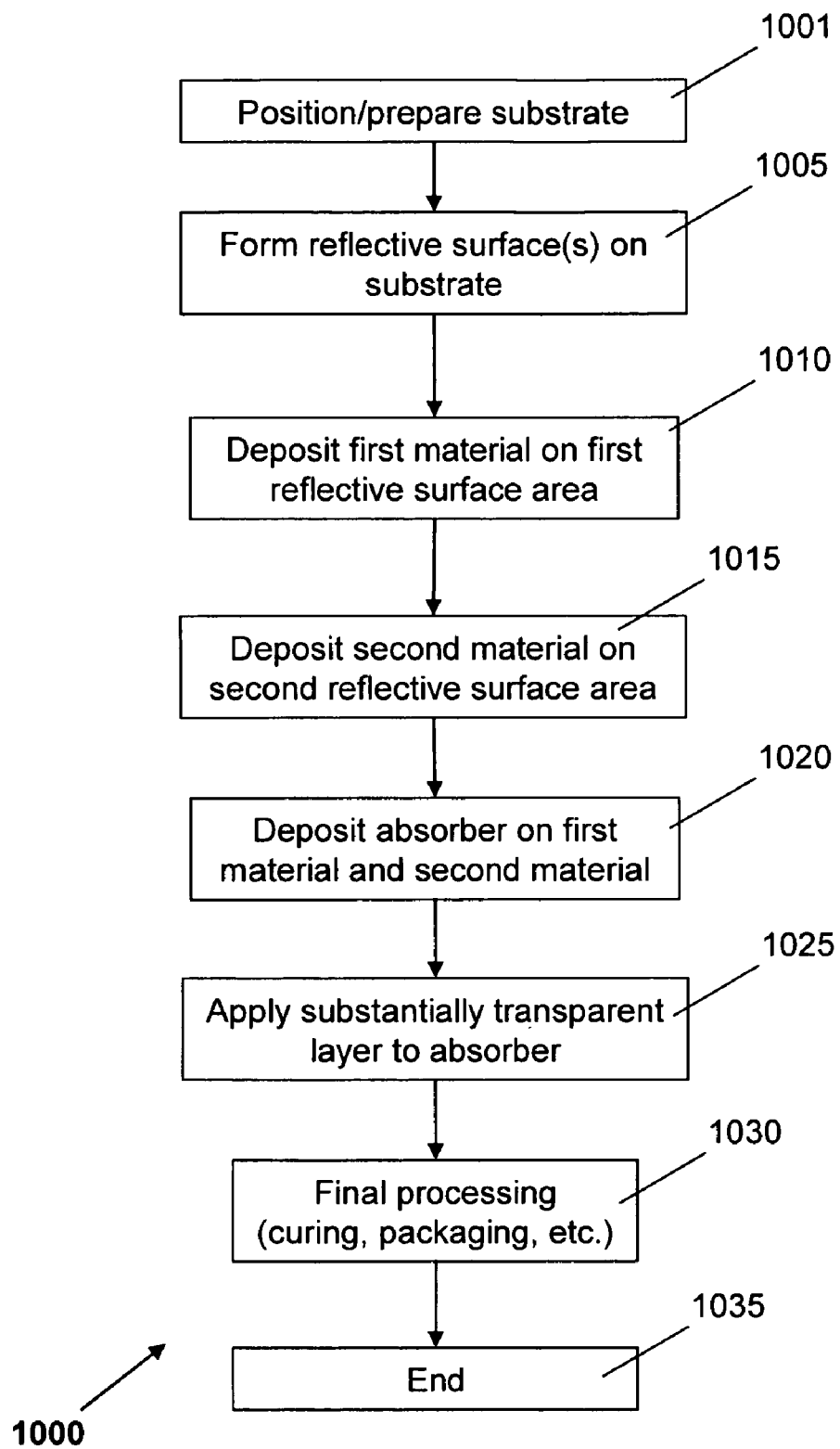
FIG. 10 is a flow chart that outlines steps of forming the thin film stacks of FIG. 9A or 9B according to some implementations of the invention.

Alternative stacks and methods of fabrication are provided herein. FIGS. 9A, 9B and 10 illustrate two such stacks and a corresponding method of fabrication. Referring first to FIG. 9A, substrate 905 is first prepared (see step 1001 of FIG. 10). The preparation process may involve cleaning, drying, etching, embossing, etc. For example, an embossing process or the like may be used to prepare recesses of a desired depth in the substrate.

Then, reflector 915 is deposited onto substrate 905. (See step 1005 of FIG. 10.) Step 1005 may involve applying a continuous reflector layer 915, as shown in FIG. 9A. However, in some implementations, step 1005 may involve applying a discontinuous reflector and/or applying reflector material only in certain portions of the substrate. Alternatively, the substrate 905 may have sufficient reflectivity to act as reflector 915, for example a polished aluminum substrate 905.

According to this implementation, a spacer 1 and spacer 2 are deposited on first and second areas 130 and 135 of the reflector layer. (See steps 1010 and 1015 of FIG. 10.) Spacer 1 and spacer 2 of FIG. 9A are substantially the same thickness. However, as described elsewhere herein, the spacers may be formed into any desired thickness and need not have the same thickness. Moreover, more than two spacers and/or spacer types may be formed.

Absorber layer 910 is then formed on spacer 1 and spacer 2. (See step 1020 of FIG. 10.) Then, a substantially transparent layer 920 is formed on absorber layer 910. (See step 1025 of FIG. 10.) After the final processing steps, if any (see step 1030 of FIG. 10), optical stack 900 is formed. In this example, the thickness and refractive index of spacer 1 and spacer 2 are selected such that the same peak wavelength of reflected light is passed by both optical cavities when viewed from position 925, along axis 930 that is substantially perpendicular to reflector layer 915. However, a chromatic difference may be perceived when viewed from position 935, along axis 940 that is at an angle θ relative to axis 930.

In the example depicted in FIG. 9B, the same spacer material is used in optical cavities 955, 960 and 965. In this example, the spacer material is $SiO_2$. These optical cavities include the spacer material, absorber 910 and reflectors 915. Absorber 910 is proximate substantially transparent substrate 920.

In this example, cavity 960 includes a much thicker spacer than cavities 955 and 965. Here, the thickness of cavity 960 causes reflected light to be resonant in the visible range, whether viewed from position 925 along axis 930 normal to reflector 915 or from position 935 along axis 940 that is θ degrees from axis 930.

In this example, the $SiO_2$ spacer material in cavity 960 is 760 nm thick. This causes peak wavelengths of approximately 458 nm (blue) and 571 nm (yellow) to be passed by optical cavity 960 when viewed along axis 930, corresponding to white at approximately (x=0.30, y=0.31) in the standard CIE xyY color space. When viewed along axis 940 with θ =20 degrees, cavity 960 passes peak wavelengths of approximately 421 nm (violet), 522 nm (green) and 693 nm (far red), corresponding to green at approximately (0.21, 0.44). When viewed along axis 940 with θ =34 degrees, cavity 960 passes peak wavelengths of approximately 468 nm (blue) and 621 nm (red), corresponding to magenta at approximately (0.37, 0.22).

However, the thicknesses of cavities 955 and 965 have been selected such that cavities 955 and 965 are not resonant in the visible range, whether viewed from position 925' along axis 930' normal to reflector 915 or from position 935' along axis 940' that is θ degrees from axis 930'. When viewed along axis 930', cavities 955 and 965 pass wavelengths in a broad spectral range, corresponding to white at approximately (0.332, 0.34). When viewed axis 940 with θ =45 degrees, cavities 955 and 965 still pass wavelengths in a broad spectral range, corresponding to white at approximately (0.329, 0.34).

Therefore, the light reflected from cavities 955 and 965 appears to be white and does not color shift nearly as much as light reflected from cavity 960. A colored image from cavity 960 would seem to appear out of a white background from cavities 955 and 965 as the viewing angle increases.

Although many of the components and processes are described above in the singular for convenience, it is contemplated that multiple components and repeated processes can also be used to practice that described herein. Similarly, although illustrative embodiments and applications of this invention are shown and described herein, many variations and modifications are possible which remain within the concept, scope, and spirit of the invention, and these variations would become clear after perusal of this application.

For example, in some implementations an image may be apparent when viewed from normal incidence, but no image is apparent when viewed from a sufficiently large angle. Such alternative implementations may involve optical cavities configured to pass noticeably different wavelengths when viewed along an axis perpendicular to a surface (e.g., perpendicular to a reflective surface of a cavity) and to pass substantially the same wavelength when viewed from an angle relative to that axis. Accordingly, the present embodiments are to be considered as illustrative and not restrictive, and the invention is not to be limited to the details given herein, but may be modified within the scope and equivalents of the appended claims.

We claim:

1. An apparatus, comprising:
   a substantially transparent layer;
   a reflective layer;
   a first spacer disposed between a first portion of the substantially transparent layer and a first portion of the reflective layer, the first spacer having a first index of refraction and a first thickness; and
   a second spacer disposed proximate the first spacer and between a second portion of the substantially transparent layer and a second portion of the reflective layer, the second spacer having a second index of refraction and a second thickness;
   wherein a first cavity comprising the first spacer, the reflective layer and the substantially transparent layer passes a first wavelength of reflected light when viewed along an axis substantially normal to the first portion of the reflective layer, the first cavity passing a second wavelength of reflected light and attenuating the first wavelength of reflected light when viewed from an angle θ to the axis; and
   wherein a second cavity comprising the second spacer, the reflective layer and the substantially transparent layer passes the first wavelength of reflected light when viewed along the axis, the second cavity passing a third wavelength of reflected light and attenuating the first wavelength of reflected light when viewed from the angle θ to the axis, and wherein a difference between the second wavelength and the third wavelength is perceivable as a chromatic difference to a human observer.

2. The apparatus of claim 1, wherein the reflective layer is discontinuous.

3. The apparatus of claim 1, further comprising an absorber layer disposed between the first spacer and the substantially transparent layer, the absorber layer being further disposed between the second spacer and the substantially transparent layer.

4. The apparatus of claim 1, wherein an interface is formed by a first edge of the first spacer that is proximate a second edge of the second spacer, the interface not being discernable to a human observer when viewed along the axis, but being discernable to the human observer when viewed from the angle θ to the axis.

5. An apparatus, comprising:
   a substantially transparent layer;
   a reflective layer;
   a first spacer disposed between a first portion of the substantially transparent layer and a first portion of the reflective layer, the first spacer having a first index of refraction and a first thickness; and
   a second spacer disposed proximate the first spacer and between a second portion of the substantially transparent layer and a second portion of the reflective layer, the second spacer having a second index of refraction and a second thickness;
   wherein a first cavity comprising the first spacer, the reflective layer and the substantially transparent layer passes a first wavelength of reflected light when viewed along an axis substantially normal to the first portion of the reflective layer, the first cavity passing a second wavelength of reflected light and attenuating the first wavelength of reflected light when viewed from an angle θ to the axis;
   wherein a second cavity comprising the second spacer, the reflective layer and the substantially transparent layer passes the first wavelength of reflected light when viewed along the axis, the second cavity passing a third wavelength of reflected light and attenuating the first wavelength of reflected light when viewed from the angle θ to the axis, and
   wherein an interface is formed by a first edge of the first spacer that is proximate a second edge of the second spacer, wherein the interface forms a portion of a code that is readable by an optical scanner when the optical scanner is positioned to read at the angle θ to the axis, wherein the code is not readable by the optical scanner when the optical scanner is positioned to read along the axis.

6. The apparatus of claim 1, wherein at least one of the first wavelength, the second wavelength or the third wavelength is outside a range of wavelengths perceivable to a human observer.

7. The apparatus of claim 4, wherein the interface forms at least part of an image that is visible to a human observer when viewed from the angle θ to the axis but not visible to the human observer when viewed along the axis.

8. An apparatus, comprising:
   a substantially transparent layer;
   a reflective layer;
   first means for passing a first peak wavelength of light when viewed along an axis perpendicular to a first portion of the reflective layer and for passing a second peak wavelength of light when viewed from an angle θ to the axis; and
   second means for reinforcing passing the first peak wavelength of light when viewed along the axis and for passing a third peak wavelength of light when viewed from the angle θ to the axis, wherein an interface is formed by a first edge of the first means that is proximate a second edge of the second means, the interface being discernable to a human observer when viewed from the angle θ to the axis but not being discernable to a human observer when viewed along the axis.

9. The apparatus of claim 8, wherein a difference between the second peak wavelength and the third peak wavelength is perceivable as a chromatic difference to a human observer.

10. An apparatus, comprising:
a substantially transparent layer;
a reflective layer;
first means for passing a first peak wavelength of light when viewed along an axis perpendicular to a first portion of the reflective layer and for passing a second peak wavelength of light when viewed from an angle θ to the axis; and
second means for reinforcing passing the first peak wavelength of light when viewed along the axis and for passing a third peak wavelength of light when viewed from the angle θ to the axis, wherein an interface is formed by a first edge of the first means that is proximate a second edge of the second means, wherein the interface forms a portion of a code that is readable by an optical scanner when the optical scanner is positioned to read at the angle θ but not readable by the optical scanner when the optical scanner is positioned to read along the axis.

11. The apparatus of claim 8, wherein at least one of the first peak wavelength, the second peak wavelength or the third peak wavelength is outside a range of wavelengths perceivable to a human observer.

12. The apparatus of claim 8, wherein the interface forms at least part of an image that is visible to a human observer when viewed from the angle θ but not visible to a human observer when viewed along the axis.

13. A method, comprising:
forming an absorber layer on a substantially transparent sheet;
depositing a first material on the absorber layer in a first area;
depositing a second material on the absorber layer in a second area proximate the first area;
forming a first reflective surface on the first material; and
forming a second reflective surface on the second material,
wherein the first material has a first index of refraction and a first thickness and wherein the absorber layer, the first material and the first reflective surface form a first cavity configured to pass a first wavelength of light when viewed along an axis perpendicular to the first reflective surface and to pass a second wavelength of light and attenuate the first wavelength of light when viewed from an angle θ to the axis; and
wherein the second material has a second index of refraction and a second thickness and wherein the absorber layer, the second material and the second reflective surface form a second cavity configured to pass the first wavelength of light when viewed along the axis and to pass a third wavelength of light and attenuate the first wavelength of light when viewed from the angle θ to the axis.

14. The method of claim 13, wherein the first reflective surface and the second reflective surface are continuous.

15. The method of claim 13, wherein the first reflective surface and the second reflective surface are discontinuous.

16. A method, comprising:
forming a first reflective surface on a first area of a substrate;
forming a second reflective surface on a second area of the substrate proximate the first reflective surface;
depositing a first material on the first reflective surface;
depositing a second material on the second reflective surface;
applying a first absorber on the first material; and
applying a second absorber on the second material,
wherein the first material has a first index of refraction and a first thickness and wherein the absorber layer, the first material and the first reflective surface form a first cavity configured to pass a first wavelength of light when viewed along an axis perpendicular to the first reflective surface and to pass a second wavelength of light and attenuate the first wavelength of light when viewed from an angle θ to the axis; and
wherein the second material has a second index of refraction and a second thickness and wherein the absorber layer, the second material and the second reflective surface form a second cavity configured to pass the first wavelength of light when viewed along the axis and to pass a third wavelength of light and attenuate the first wavelength of light when viewed from the angle θ to the axis.

17. The method of claim 16, wherein forming the first reflective surface and the second reflective surface comprises forming a continuous reflective layer on the first area and the second area of the substrate.

18. The method of claim 16, wherein applying the first absorber and the second absorber comprises applying a continuous absorber layer on the first material and the second material.

19. The apparatus of claim 1, wherein the first index of refraction is different from the second index of refraction.

20. The apparatus of claim 5, wherein the first index of refraction is different from the second index of refraction.

* * * * *

UNITED STATES PATENT AND TRADEMARK OFFICE
CERTIFICATE OF CORRECTION

PATENT NO. : 7,940,463 B2
APPLICATION NO. : 12/148057
DATED : May 10, 2011
INVENTOR(S) : Manish Kothari et al.

It is certified that error appears in the above-identified patent and that said Letters Patent is hereby corrected as shown below:

In Claim 8 in Column 12, line 59, remove "reinforcing".

In Claim 10 in Column 13, line 12, remove "reinforcing".

Signed and Sealed this
Twenty-third Day of October, 2012

David J. Kappos
*Director of the United States Patent and Trademark Office*